(No Model.) 2 Sheets—Sheet 1.
P. H. THOMPSON.
DRAFT GEAR FOR VEHICLES.
No. 418,628. Patented Dec. 31, 1889.
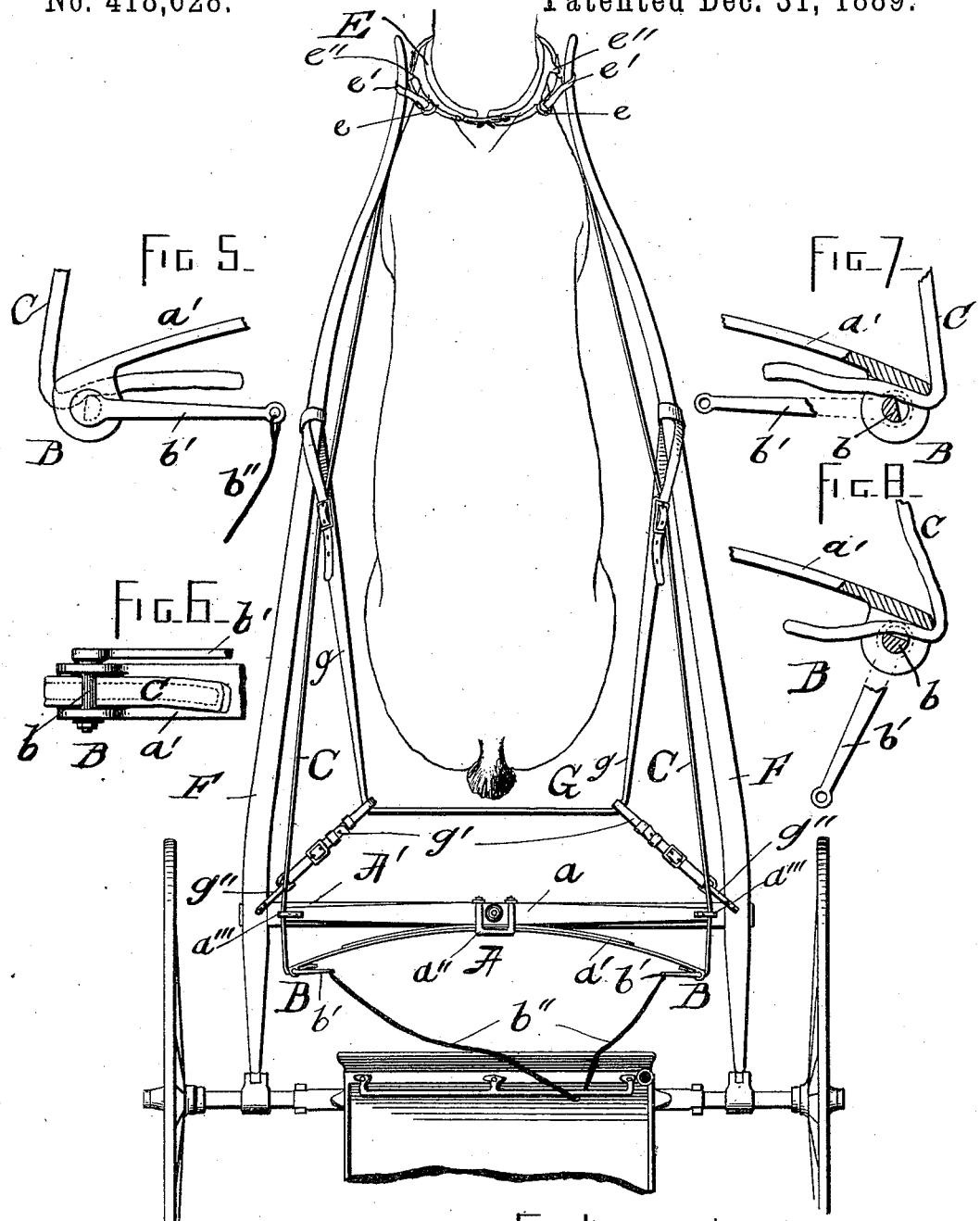
WITNESSES
R. B. Shepherd
INVENTOR
Patrick H. Thompson
By Attorney
Albert A. Wood (No Model.) 2 Sheets—Sheet 2.
P. H. THOMPSON.
DRAFT GEAR FOR VEHICLES.
No. 418,628. Patented Dec. 31, 1889.
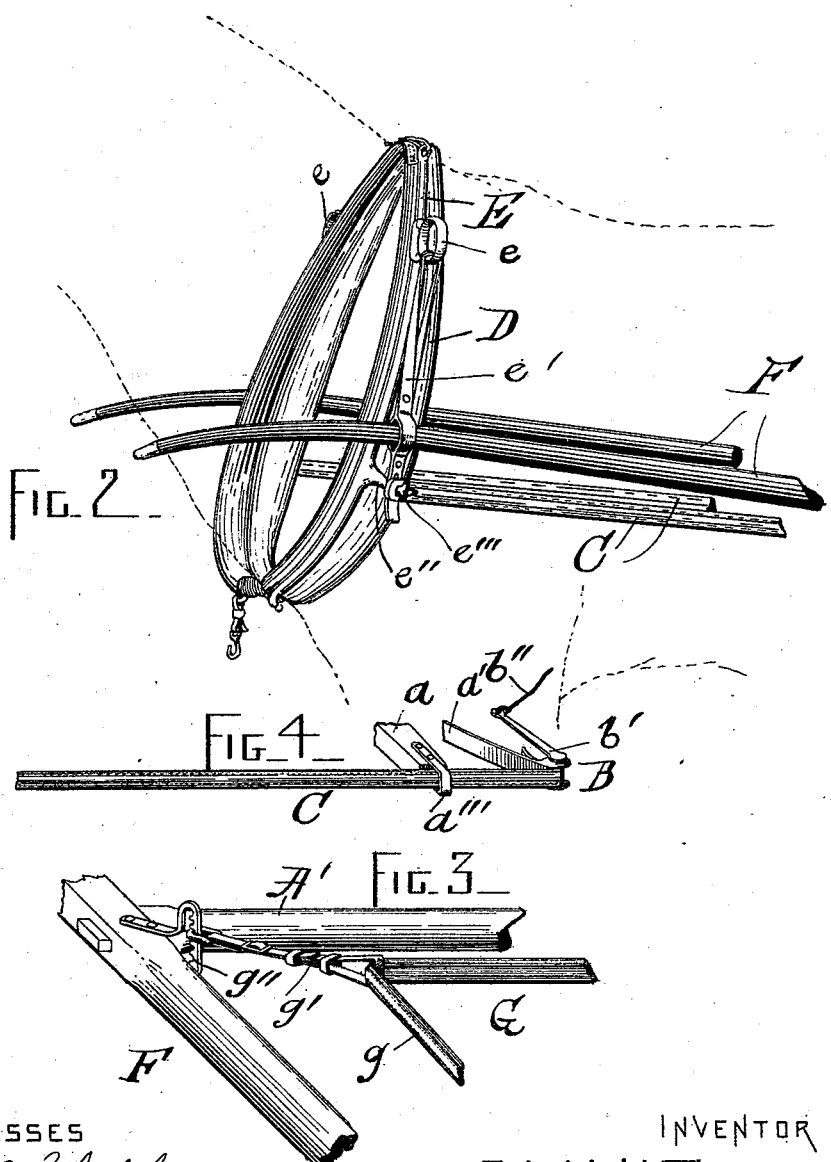
WITNESSES
INVENTOR
Patrick H. Thompson
BY ATTORNEY

UNITED STATES PATENT OFFICE.

PATRICK HENRY THOMPSON, OF BLUFFTON, GEORGIA.

DRAFT-GEAR FOR VEHICLES.

SPECIFICATION forming part of Letters Patent No. 418,628, dated December 31, 1889.

Application filed September 19, 1889. Serial No. 324,403. (No model.)

*To all whom it may concern:*

Be it known that I, PATRICK HENRY THOMPSON, a citizen of the United States, and a resident of Bluffton, in the county of Clay and State of Georgia, have invented certain new and useful Improvements in Draft-Gear for Vehicles; and I do hereby declare the following to be a full, clear, and exact description of the invention, such as will enable others skilled in the art to which it appertains to make and use the same, reference being had to the accompanying drawings, and to letters of reference marked thereon, which form part of this specification.

This invention has reference to harnesses, and more specifically to that class of harnesses in which the horse is easily and quickly detached in case of an impending runaway, and also where there are safety devices to prevent kicking and a horse becoming in other ways unmanageable, this construction also admitting of quick and easy unharnessing of the horse, leaving the hames attached to the conveyance, the details of all of which and the objects and advantages of each will be hereinafter fully set forth, and the parts claimed as new pointed out in the claims.

In the accompanying drawings, Figure 1 is a plan of the device as it would appear in use in drawing forward the conveyance, each of the various details being shown as they would be seen from directly above the horse. Fig. 2 is a side elevation of the horse wearing the collar, to which is attached the improved hame, and showing method of carrying the outer ends of the thills on the hames in such a manner that the horse has free side motion therein without causing the collar to chafe or to bear too hard on either side, and showing the forward end of the trace as it is attached to the hame. Fig. 3 is a sectional perspective view of the adjustable attachment for the straps holding the breeching in position and away from the horse. Fig. 4 is a sectional perspective view of the end of the singletree to which the trace is attached on one side, the other end being obviously an exact duplicate thereof, this figure showing the trace passing through a loop in the end of the singletree and passing into the clamping device on the end of the draft-spring. Fig. 5 is a plan of one end of the draft-spring, Fig. 6 being a back elevation of the same, both showing the trace in position. Figs. 7 and 8 show the operative parts of the clamp in section for the purpose of illustrating their operation and necessary construction, Fig. 7 showing the trace held by the same clamp, while Fig. 8 shows it released, a comparison of the two figures showing the operation necessary to hold and to release the said trace.

In the figures like reference-marks indicate corresponding parts in the several views.

In this construction the harness from being attached to the conveyance when not in use becomes a part thereof, as there is no necessity of ever detaching the harness, except in case of a runaway being imminent, the harness at all other times, both in and out of use, being attached to the conveyance.

The singletree A is composed of the bar $a$ and the draft-spring $a'$, secured thereto in any approved manner, preferably by means of the clamp $a''$ passing around the said spring and singletree. The singletree is preferably secured to its ends by loops $a'''$, through which passes the trace on its way to the clamp B, which clamp is formed of the eccentric $b$, journaled in ears on the ends of the spring $a'$, and being so formed that the movement of the lever $b'$ toward the conveyance will turn the flat side of the eccentric approximately parallel with the trace as it passes through the clamp and release the same. This clamp-fastening is fully set up in Figs. 1, 4, 5, 6, 7, and 8, its construction, as shown in those figures and described above, being its preferable form by reason of its simplicity and ease of operation. From the ends of the lever $b'$ the cords $b''$ extend into the body of the conveyance and within easy reach of the driver. The spring $a'$ is preferably of several leaves, after the same manner as ordinary carriage-springs. The singletree A is secured to the cross-bar of the thills by means of the ordinary pin passing through both and being secured therein. The ends of the traces C are left flat, as shown in the drawings, and have no hole through them, as is usual where the ordinary attachment is used, which is advantageous, inasmuch as it adds to the strength of the said traces. These traces in use pass forward in the ordinary manner after leaving the singletree just described and are attached to the collar, as will be seen after the description of the same.

The collar D and hames E are best shown in Fig. 2; but reference to Fig. 1 will aid in the complete understanding of the construction thereof. The collar D is of the ordinary form, being hinged at the top and secured by link or hook or other suitable fastening at the bottom ends of the hames. These hames E are made of metal, preferably, and are secured together at the top by eyes and lacing, as shown in Fig. 2, substantially, and have the hame-rings $e$ for the suspension of the reins, to which hame-rings, by means of the straps $e'$, are suspended the thills F, which may be raised or lowered, if desired, by shortening or lengthening the strap between the loop through which pass the thills and its point of suspension by the ring $e'$. This strap $e$ is secured at its lower end to the studs $e''$, projecting from the outer sides of the hames, and to which studs are secured the traces by means of the button $e'''$, the hole in the end of the trace being slotted in order to pass over the said button when parallel with its oblong head.

The breeching G consists of a strap $g$ of sufficient length attached at each end to opposite thills in the usual manner—that is, by passing through a staple and being held by a hitch around the thill and a buckle at the necessary position in the strap. This breeching is of sufficient length to be, when secured as just described, approximately in the position shown in Fig. 2, and is held from contacting with the horse by the corner-straps $g'$, which are best shown in Fig. 3, the said straps being connected at one end to the strap G, and at the other by means of a hook or loop of metal to the clevises $g''$, which has notches on the inner side of its loop for the purpose of raising the breeching to adjust it to a higher horse, or moving it in the opposite direction to adjust it to a smaller one. These straps $g$ are so adjustable in length in order that the breeching may at all times be kept stretched tight. It is obvious that this breeching will perform the function of the ordinary breeching by coming against the horse's flanks in descending a grade, and that it will at all times prevent his kicking and doing damage to the vehicle thereby, and also, by coming against him when he stops, it will prevent balking, as it is found by experience that this action will urge a horse forward gently without hurting or frightening him, as it does not at all times bear on his flanks, but will come forward and strike them as the horse suddenly stops and settles back slightly, owing to the action of the draft-spring.

On reference to the drawings, and especially to Fig. 2, it will be obvious that by unhooking the collar, as shown in that figure, it can be lifted off the horse and leave him entirely free, with the exception of the bridle, which is of the ordinary kind. To take the bridle off is comparatively a simple matter, and need not consume any material length of time, the reins being simply unbuckled therefrom and knotted loosely in front of the hame-rings, which will effectually prevent their misplacement.

Having thus described my invention, what I claim as new, and desire to secure by Letters Patent of the United States, is—

1. In a safety-draft for vehicles, the single-tree A, composed of the part $a$ and the spring $a'$, secured to the said part $a$ and having attaching and detaching devices B on its ends, consisting of the eccentric and the levers $b'$ and the cords $b''$, in combination with the traces C of a harness, all combined, arranged, and operating substantially as shown and described, and for the purpose specified.

2. In a safety draft-gear for vehicles, for the purpose of sustaining the thills, the hames E, having hame-rings $e$, and being provided with straps $e'$, attached to the said rings $e$ and to the buttons $e'''$ on the studs $e''$, and the traces C, in combination with suitable means for the attachment of the said traces to the vehicle, substantially as shown and described.

3. In a safety draft-gear for vehicles, a breeching consisting of the strap G, secured to the thills, as set forth, in combination with the straps $g$, attached to the said breeching loosely and to the thills near the point of joining the thill and the cross-bar thereof, all arranged and operating substantially as shown and described, and for the purpose specified.

4. In a safety draft-gear for vehicles, a breeching consisting of the straps G, secured to the thills, as set forth, in combination with the straps $g$, attached to the said breeching in such a manner that the said breeching may have play through the loop in the said straps $g'$ and attached to the clevis $g''$, said clevis being secured to the thills near the point of their attachment to the cross-bar A', all combined, arranged, and operating substantially as shown and described, and for the purpose specified.

In testimony whereof I hereunto affix my signature in presence of two witnesses.

PATRICK HENRY THOMPSON.

Witnesses:
J. E. MANSFIELD,
P. H. SINGLETON.